April 4, 1939.    A. R. CLARK    2,153,237
SPRING SUSPENSION FOR VEHICLES
Filed June 30, 1937
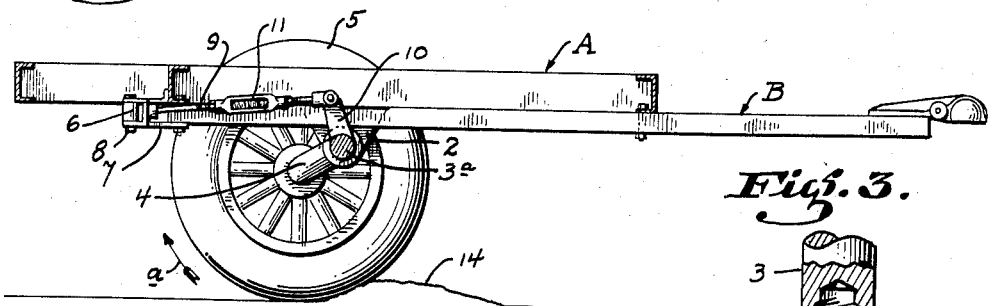
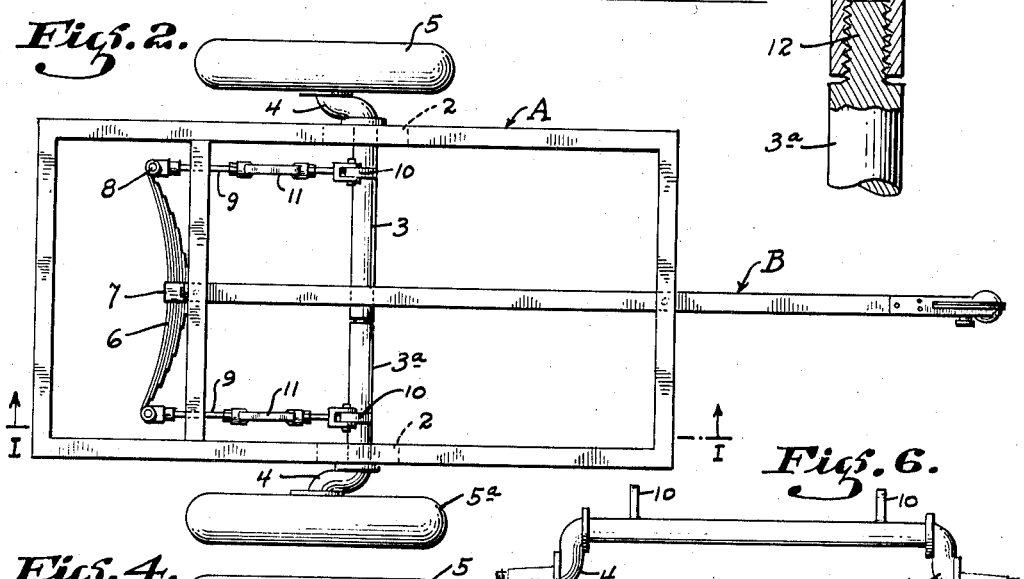
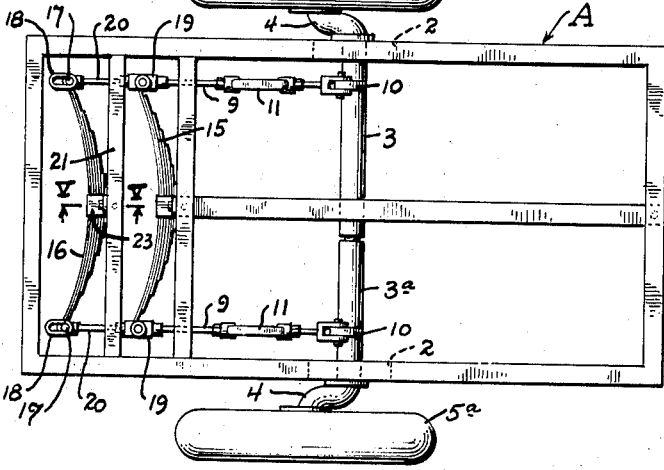
INVENTOR.
Aurelius R. Clark.
BY Chas. E. Townsend.
ATTORNEY.

Patented Apr. 4, 1939

2,153,237

UNITED STATES PATENT OFFICE 2,153,237

SPRING SUSPENSION FOR VEHICLES

Aurelius R. Clark, Martinez, Calif.

Application June 30, 1937, Serial No. 151,131

1 Claim. (Cl. 267—19)

This invention relates to a spring suspension for vehicles such as trailers, semi-trailers, motor trucks and the like, and especially to a spring suspension in which semi-elliptical and similar springs may be positioned to flex in a horizontal plane with relation to the frame of the vehicle.

The object of the present invention is generally to improve and simplify the construction and operation of spring suspension for vehicles; to provide a spring suspension which permits material lowering of the main frame with relation to the wheel supporting axles of a vehicle; to provide a structure in which semi-elliptical or similar springs may be secured crosswise of the main frame and in a position which permits flexing in a horizontal plane; to provide a structure in which a plurality of springs may be so disposed and connected as to act singly or in unison as the load on the vehicle increases; and further, to provide a structure employing a divided axle to permit each wheel to act independently of the other.

The invention is shown by way of illustration in the accompanying drawing in which—

Fig. 1 is a central, vertical, longitudinal section of a trailer showing the spring suspension applied thereto;

Fig. 2 is a plan view of the trailer;

Fig. 3 is an enlarged sectional view of a portion of a divided axle showing the manner in which the axle sections are connected;

Fig. 4 is a plan view of a trailer showing a modified form of a spring suspension;

Fig. 5 is an enlarged cross section taken on line 5—5 of Fig. 4; and

Fig. 6 shows a solid form of axle.

Referring to the drawing in detail, and particularly Figs. 1, 2 and 3, A indicates the main frame of a trailer and B the drawbar secured thereto. Secured to opposite sides of the frame are bearings 2, and extending therethrough is an axle which is centrally divided into two sections 3 and 3a. On the outer end of each axle section is a crank arm 4 and a spindle, and journaled on the respective spindles are the usual wheels 5 and 5a.

A single spring 6 of the semi-elliptical leaf spring type is employed to cushion the action of both wheels with relation to the frame. The spring is in this instance disposed crosswise of the frame and is secured to the inner end of the drawbar by means of a clip 7 or the like, and the opposite ends of the spring are provided with shackles 8 and rods 9 whereby connection is made with crank arms 10 secured to the respective axle sections. The axle sections are connected to each other to prevent endwise separation and spreading of the frame by any suitable tie which permits independent rotation of each section, a suitable connection for this purpose being that shown in Fig. 3 wherein one section is threaded into the other as indicated at 12.

In actual operation, when one wheel or another encounters a raise in the road surface such as shown at 14 in Fig. 1, crank 4 will tend to rotate the connected axle section in the direction of arrow a. The connected crank arm 10 will obviously swing in the same direction, and as such, exert a pull through rod 9 which will be resisted by spring 6, and as the spring is positioned crosswise of the frame and in a horizontal plane, the flexing of the spring when a pull is exerted will also be in a horizontal plane. A turn buckle 11 may be provided in connection with each rod 9, this being important as it permits tensioning of spring 6 to suit varying loads. In Figs. 4 and 5, a multiple arrangement of springs is shown, the first spring 15 being connected to the respective axle sections in a manner identical to that illustrated in Fig. 2. The second spring 16 is connected to shackles 17 having slots 18 formed therein, and these are in turn connected to the shackles 19 by rods 20. By this multiple arrangement of springs, an empty or partially loaded trailer will ride on spring 15, but when fully loaded, this spring flexes sufficiently to permit the second spring to come into play. Where a second spring is employed, a crossbar 21 is employed, a spacing block 22 is secured to the lower face thereof (see Fig. 5) and spring 16 is secured thereto by means of a clip 23. A solid axle of the type shown in Fig. 6 may also be employed, and is particularly applicable to light weight trailers such as used for camping and like purposes.

While the spring suspension here disclosed is shown as applied to a two-wheeled trailer, it may be applied to larger trailers, semi-trailers and trucks employing four or more wheels, and may also be applied to vehicles of this character when it is desired to add auxiliary load-carrying wheels. In such installations it is possible to raise the auxiliary load-carrying wheels clear of the road surface when running empty or with a light load, as this is readily accomplished by merely lengthening the rods 9 through slacking up on the turnbuckles 11.

The construction of the spring suspension is exceedingly simple and easy to apply to any vehicle, the number of springs employed is reduced to one-half when compared to standard practice, it permits material lowering of the main frame with relation to the vehicle-supporting axles, it makes possible the application of auxiliary load-carrying wheels to semi-trailers and trucks due to the positioning of the springs crosswise of the frame where space would otherwise not permit when standard spring suspension is employed, and in addition to the above, provides greater flexing of the springs with improved riding qualities.

While these and other features of the present invention have been more or less specifically described and illustrated, I wish it understood that various changes may be resorted to within the scope of the appended claim, and that the materials and finish of the several parts employed may be such as the experience and judgment of the manufacturer may dictate or other conditions may demand.

Having thus described my invention, what I claim and desire to secure by Letters Patent is—

A spring suspension for vehicles comprising a pair of bearing members secured to the main frame of a vehicle one on each side thereof, an axle extending crosswise of the frame and through the bearings, said axle being divided centrally into two sections, one axle section having a hole drilled in its end, and threaded, and the other axle section having a projection which is externally threaded, and said projection being screwed into the internally threaded portion of the adjacent axle section to connect the divided axle against longitudinal separation but permitting free rotation of each axle section with relation to the other, a crank arm on the outer end of each axle, a spindle on the outer end of each crank arm, a wheel journaled on each spindle, a leaf-spring disposed crosswise of the frame and secured thereto, said spring being flexible in a horizontal plane, a second crank arm adjacent the outer end of each axle section, rods connecting said crank arms with opposite ends of the leaf-spring, and means for shortening or lengthening the rod connection between the spring and the last named crank arms to increase or decrease the tension of the spring.

AURELIUS R. CLARK.